United States Patent

[11] 3,530,900

[72] Inventor Arthur S. Kish
  Lyndhurst, Ohio
[21] Appl. No. 756,530
[22] Filed Aug. 30, 1968
  Continuation-in-part of Ser. No. 652,320,
  July 10, 1967, abandoned
[45] Patented Sept. 29, 1970
[73] Assignee Murray Corporation
  Cockeysville, Maryland
  a corporation of Maryland

[54] HOSE ASSEMBLY
  9 Claims, 14 Drawing Figs.
[52] U.S. Cl. .................................................. 138/109,
  285/174
[51] Int. Cl. .................................................. F16l 9/22
[50] Field of Search .................................. 138/109;
  72/304, 367; 138/89, 96; 245/175, 174

[56] References Cited
UNITED STATES PATENTS

| | | | |
|---|---|---|---|
| 1,310,134 | 7/1919 | Poston | 285/174X |
| 2,430,921 | 11/1947 | Edelmann | 285/174X |
| 2,534,811 | 12/1950 | Corlett | 138/109X |
| 2,626,167 | 1/1953 | Lake | 285/174 |
| 2,700,988 | 2/1955 | Smisko | 138/109X |

Primary Examiner—Louis K. Rimrodt
Attorney—Isler and Ornstein

ABSTRACT: The invention is concerned with the provision of a hose assembly in which the hose is clamped between a nipple and a shell, and the shell is provided with a swaged end which is brazed to the nipple to thereby provide a fluid tight joint in this area of the assembly. The shell is made from a thin-walled tube of deep-drawing steel of uniform wall thickness swaged to provide a conical flange which functions as a stop or shoulder for the end of the hose and exerts an inward camming effect on the end of the hose to improve the seal between the hose and nipple. The invention is also concerned with a novel and highly efficient machine or apparatus for crimping the body of the shell to the hose, and which is characterized by the use of reciprocable crimping jaws.

INVENTOR.
ARTHUR S. KISH
BY
Isler & Ornstein
ATTORNEYS

Patented Sept. 29, 1970 3,530,900

INVENTOR.
ARTHUR S. KISH
BY
Isler & Ornstein
ATTORNEYS

HOSE ASSEMBLY

This application is a continuation-in-part of my copending application, Ser. No. 652,320, filed July 10, 1967 now abandoned.

The invention relates generally to hose assemblies or connections, which may be used generally in hydraulic systems, such as automotive air conditioning systems, power steering and braking systems, and other industrial applications.

A primary object of the invention is to provide a hose assembly of the character described, in which the hose is clamped between a nipple and a shell and the shell is provided with a swaged end which is brazed to the nipple to thereby provide a fluid-tight joint in this area of the assembly.

Another object of the invention is to provide an assembly of the character described, including a seat or block which is also brazed to the nipple to augment the fluid-tightness of the assembly.

A further object of the invention is to provide an assembly of the character described, which includes improved means for clamping the shell to the hose and the hose to the nipple.

A further object of the invention is to provide an assembly of the character described, wherein the outer diameter of the nipple which extends into one end of the hose is the same as the inner diameter of the hose, whereby to facilitate insertion of the nipple into the hose with minimum effort, prior to the clamping of the shell to the hose and the hose to the nipple, and to reduce to a minimum internal recesses or shoulders after the clamping of the shell to the hose and the hose to the nipple, which recesses or shoulders might impede the flow of fluid through the fluid system.

A further object of the invention is to provide a new and improved method of assembling the components of the assembly.

A still further object of the invention is to provide novel apparatus or means for clamping the shell of the assembly to the hose and the hose to the nipple.

Other objects and advantages of my invention will be apparent during the course of the following description.

In the accompanying drawings forming a part of this specification, and in which like numerals are employed to designate like parts throughout the same, FIG. 1 is a fragmentary plan view showing the components of the hose assembly in assembled relation, prior to the operation of clamping or crimping the shell to the hose and the hose to the nipple;

Figure 1:
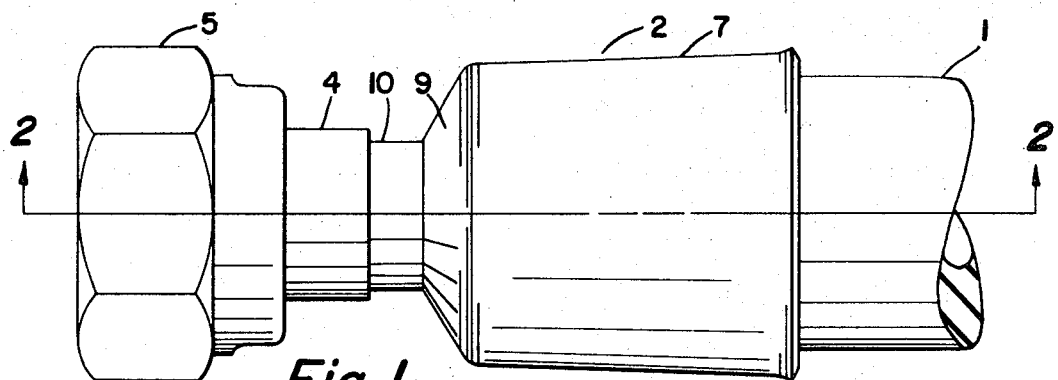
Figure 2:
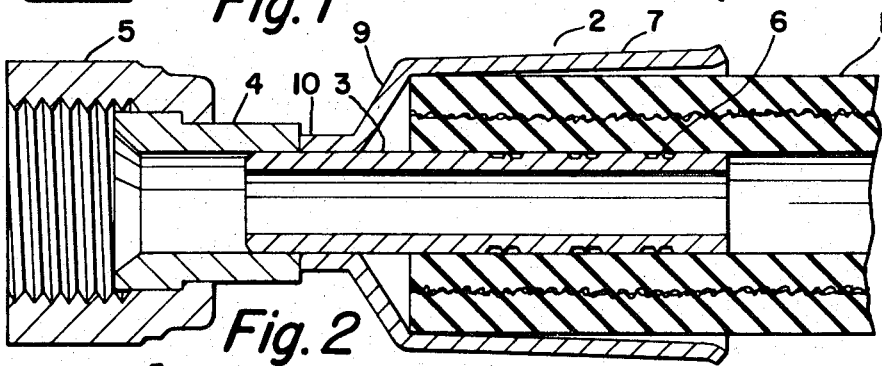
FIG. 2 is a cross-sectional view, taken on the line 2-2 of FIG. 1.

Referring more particularly to FIGS. 1 and 2 of the drawings, there is disclosed a hose assembly for use in automotive air conditioning systems, the assembly consisting of a hose 1, a shell 2, a tube or nipple 3, a seat or adapter 4, and a nut 5.

The hose is a standard type of hose, made, for example, of seamless oil-resistant synthetic rubber designed for minimum penetration through the walls thereof of refrigerants of the type used in automotive air conditioning systems, and usually reinforced with plies of braided yarn bonded to the rubber.

The tube or nipple 3 is made of welded steel tubing and extends partially into one end of the hose 1. To facilitate entry of the nipple into the hose with a minimum of effort, the outer or external diameter of the nipple is the same as the internal diameter of the hose, as best seen in FIG. 2. Also, as best seen in FIG. 2, the entry of the hose into the shell is facilitated by making the body portion of the shell 2 slightly bell-mouthed.

The portion of the tube or nipple 3 which extends into the hose is provided with a series of axially-spaced circumferential ridges 6, formed by machining grooves in the outer wall of the tube adjacent the ridges. These ridges serve a purpose to be presently described.

The shell 2 is made from a thin-walled tube of deep-drawing steel of uniform wall thickness, which is swaged at one end to provide a conical flange 9, which functions as a stop or shoulder for the end of the hose 1, and from which a short cylindrical portion 10 of reduced diameter extends rearwardly. The portion 10 has an internal diameter corresponding substantially to the external diameter of the tube or nipple 3, and is copper-brazed to the tube or nipple 3, so as to provide a fluid-tight seal between the shell 2 and the nipple 3.

The shell 2 is characterized by the fact that the inner wall of the body thereof is relatively smooth and free from grooves or protuberances which would interfere with the introduction of the end of the hose 1 into the space between this inner wall and the tube or nipple 3, as shown in FIG. 2.

By utilizing a swaged shell 2, of the construction shown and described, the cost of the shell is reduced to a mere fraction of the cost of a shell made of solid stock and machined to the form shown.

The end of the nipple 3 projects slightly beyond the end of the portion 10 of the shell 2, to thereby provide a portion which extends into one end of the seat or adapter 4. The portion of this seat or adapter which receives the nipple 3 is copper-brazed to the nipple.

The nut 5 is mounted on the seat or adapter 4, to thereby provide with the seat 4 a means for connection to other parts of the air conditioning system.

Figure 3:
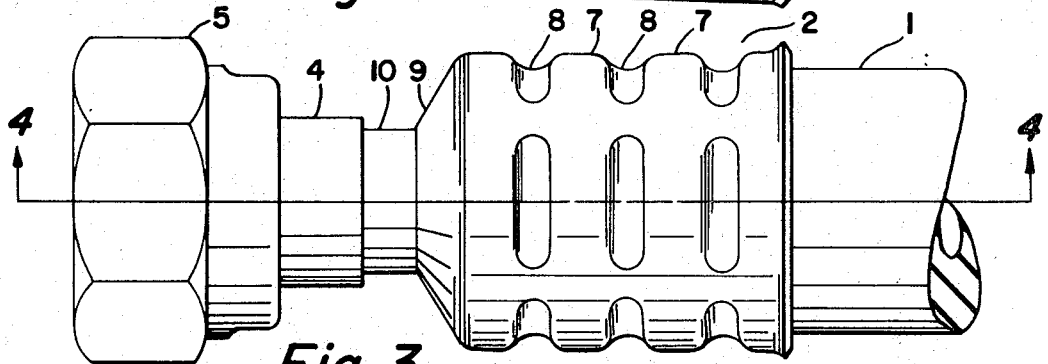
FIG. 3 is a view similar to FIG. 1, but showing the completed assembly, that is, the shell clamped or crimped to the hose, and the hose clamped to the nipple.
Figure 4:
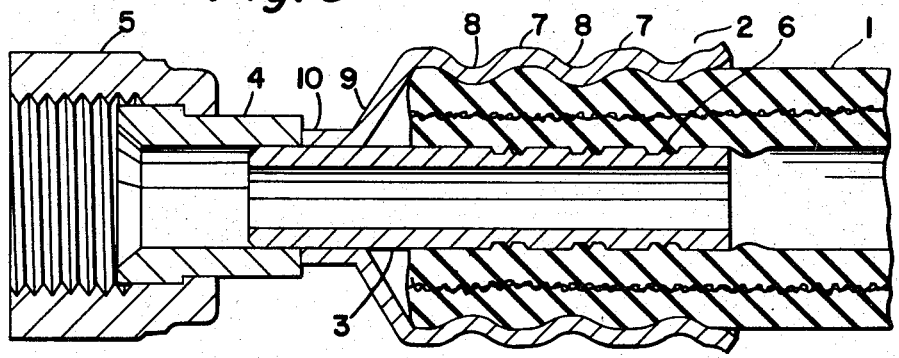
FIG. 4 is a cross-sectional view, taken on the line 4-4 of FIG. 3.

With the parts of the assembly assembled, as shown in FIGS. 1 and 2, the assembly is then subjected to a crimping operation, as a result of which a finished assembly is provided, as shown in FIGS. 3 and 4.

This crimping operation is performed by means of apparatus to be presently described, and consists in the formation of crimps 8 in the body 7 of the shell 2, thereby providing a firm frictional grip or interlock between the hose and the shell. At the same time, the crimping operation causes the ridges 6 of the tube or nipple 3 to become embedded in the inner wall of the hose, and thereby provide not only a good frictional contact or interlock between the hose and tube, but also to provide a tight seal against passage of refrigerant between the hose and tube.

The depth of the ridges 6 varies from .008" to .016" depending on the dimensions of the nipple, and the hose is compressed only sufficiently to embed the ridges in the inner wall of the hose. As a consequence, the diameter of the unstressed bore of the hose, as indicated at B in FIG. 4, is not substantially greater than the inner diameter of the nipple, so that the formation of internal recesses or shoulders in the system, which would impede the flow of refrigerant through the system is virtually eliminated.

The assembly, as thus described, is characterized by the fact that the tube or nipple 3 is of the same external diameter as the internal diameter of the hose 1, so that not only is the insertion of the nipple into the hose greatly facilitated, but the formation of internal recesses or shoulders which would impede the flow of the refrigerant through the system is avoided or virtually eliminated.

The assembly is further characterized by the fact that the shell is swaged down at one end to the external diameter of the nipple 3, and is copper-brazed to the nipple, thereby providing a fluid-tight joint in this area of the assembly. Coupled with this is the fact that the seat or adapter 4 is also copper-brazed to the nipple, to further increase the tightness of the joint in this area of the assembly.

In the course of the crimping operation to be hereinafter described, it may be noted that the conical flange 9 of the shell 2 exerts an inward camming effect on the end of the hose 1 which improves the seal between the hose and the tube or nipple 3.

Figure 5:
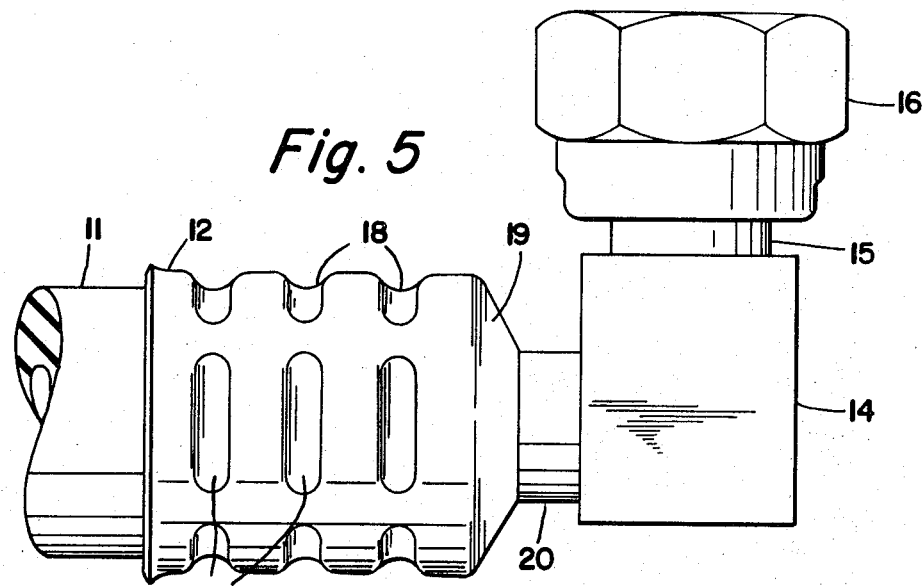
FIG. 5 is a fragmentary side elevational view of a modified form of a completed hose assembly.
Figure 6:
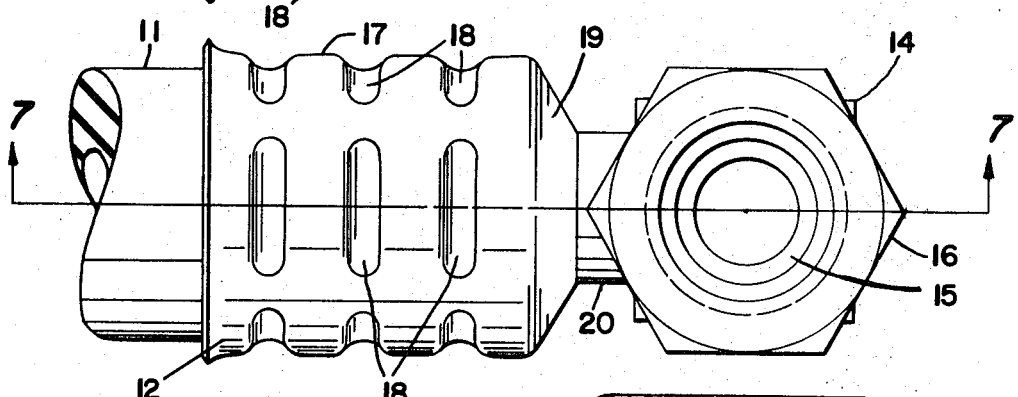
FIG. 6 is a fragmentary top plan view of the hose assembly of FIG. 5.
Figure 7:
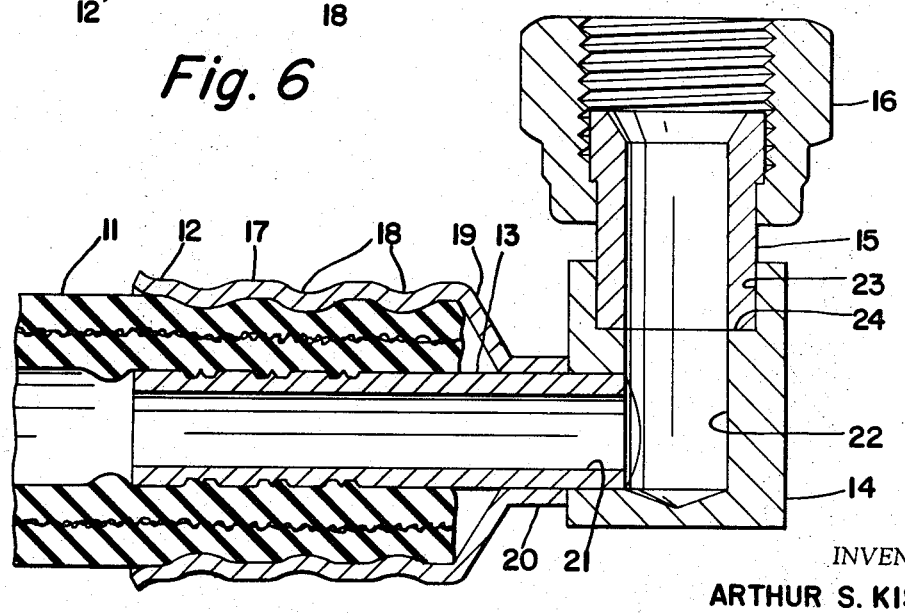
FIG. 7 is a cross-sectional view, taken on the line 7-7 of FIG. 6.

In FIGS. 5, 6 and 7 of the drawings, a modification of the hose assembly is shown, for providing a 90° travel of refrigerant therethrough, as contrasted with the assembly shown in FIGS. 3 and 4 which provides for straight or rectilinear flow of the fluid.

The hose assembly consists of a hose 11, a shell 12, a tube or nipple 13, a block 14, a seat or adapter 15, and a nut 16.

The hose, shell, tube, seat or adapter, and nut are similar, in all respects, to those shown in FIGS. 3 and 4, and need not, therefore, be described in detail.

The hose 11 is clamped between the tube 13 and the shell 12. The shell 12 has a body portion 17, which, as shown in FIGS. 1 and 2, is initially bell-mouthed so as to facilitate entry of the hose into such body portion, after which the body portion of the shell is crimped, as at 18, to the hose, thereby providing a firm frictional grip or interlock between the hose and shell.

The shell 12 is swaged at one end to provide a flange 19 which functions as a stop or shoulder for the end of the hose 11, and a short cylindrical portion 20 which has an inside diameter corresponding to the outside diameter of the tube or nipple 13. This cylindrical portion 20 is copper-brazed to the tube or nipple 13, so as to provide a fluid-tight joint between the shell 12 and nipple 13.

The end of the nipple 13 projects slightly beyond the end of the portion 20 of the shell 12, to thereby provide a portion which extends into and is brazed to the wall of an opening 21 in the side wall of the block 14. The block 14 is closed at the bottom, and is bored to provide a passageway 22, the axis of which is perpendicular to the axis of the nipple 13. The passageway 22 is counterbored, as at 23, to provide a shoulder 24 for receiving the lower end of the seat or adapter 15.

The nut 16 is mounted on the seat or adapter 15, to thereby provide with the seat 15 a means for connection to other parts of the air conditioning system.

The assembly, as shown in FIGS. 5, 6 and 7, is characterized by the fact that the tube or nipple 13 is of the same external diameter as the internal diameter of the hose 11, so that not only is the insertion of the nipple into the hose greatly facilitated, but the formation of internal recesses or shoulders which would impede the flow of refrigerant through the system is avoided or virtually eliminated.

The assembly, as shown in FIGS. 5, 6 and 7, is further characterized by the fact that the shell is swaged down at one end to the external diameter of the nipple, and is copper-brazed to the nipple, thereby providing a fluid-tight joint in this area of the assembly. Coupled with this is the fact that the block 14 is also copper-brazed to the nipple, to further increase the tightness of the joint in this area of the assembly.

Referring more particularly to FIGS. 8 to 14 inclusive, the crimping machine will be seen to comprise a base or platform 25 having an upstanding plate 26, and webs 27 interconnecting the base and plate.

The plate 26 is provided with a central opening 28 for the reception of the axial extension 29 of a stationary platen 30 having an axial opening 30a.

The platen 30 is locked in predetermined circumferential position relatively to the plate 26 by means of a fixture key 31, such, for example, as a Jergens fixture key, which is disposed in a slot 32 in the plate 26, and in a corresponding slot 33 in the platen 30, the key being secured to the plate 26 by means of a socket head screw 34. The platen 30 is then secured to the plate 26 as by means of screws which are not shown.

The platen 30 is provided in its front face with a series of circumferentially-spaced guideways 35, which extend radially from the opening 30a, and which serve a purpose to be presently described.

The platen 30 has a hub 36 on which a circular disk 37 is mounted for oscillatory movement, the disk being interposed between the platen 30 and the front face of the plate 36, and is provided at one portion of its periphery with a flat surface 38.

A second disk 39 is disposed forwardly of the disk 37, in axially-spaced relations to the latter, this spacing being provided by means of spacers 40, socket head screws 41 being provided for interconnecting the disks 37 and 39, these screws extending through the spacers and being threadedly connected to the disk 37.

The disk 39 is also provided at a portion of its periphery corresponding to the flat surface 38 of the disk 37 with a similar flat surface 42.

Disposed within the guideways 35, for reciprocal movement in these guideways, are jaw holders 43. These jaw holders are provided at their outer ends with cam surfaces 44 which are inclined to the longitudinal axis of the holders and which serve a purpose to be presently described. For the purpose of retaining the jaw holders 43 against displacement axially from the platen 30, an annular retainer plate 45 is provided, which is removably secured to the platen 30. For the purpose of moving the jaw holders 43 radially-inwardly, that is, toward the center of the machine, a series of cam rollers 46 is provided, in the form of roller bearings. These cam rollers are mounted on pins 47, which, in turn, are mounted in the disks 37 and 39 and are secured against axial displacement by means of set screws 48.

The platen 30 is provided at points spaced to correspond with the guideways 35 with recesses 49 which extend radially-inwardly from the periphery of the platen and are closed at their radially-innermost ends. Slots 50 are provided in the platen 30 between the walls of these recesses and the bottoms of the guideways 35.

Mounted in the recesses 49 for sliding movement in these recesses are plungers 51, provided with pins 52 which extend through the slots 50 and into openings 53 in the jaw holders 43. Set screws 54 are secured in the outer ends of the recesses 49 for closing these recesses. Compression coil springs 55 are interposed between the closed bottoms of the recesses 49 and the plungers 51, and serve to bias the jaw holders 43 to their outermost position at the completion of the crimping operation.

Figure 13:
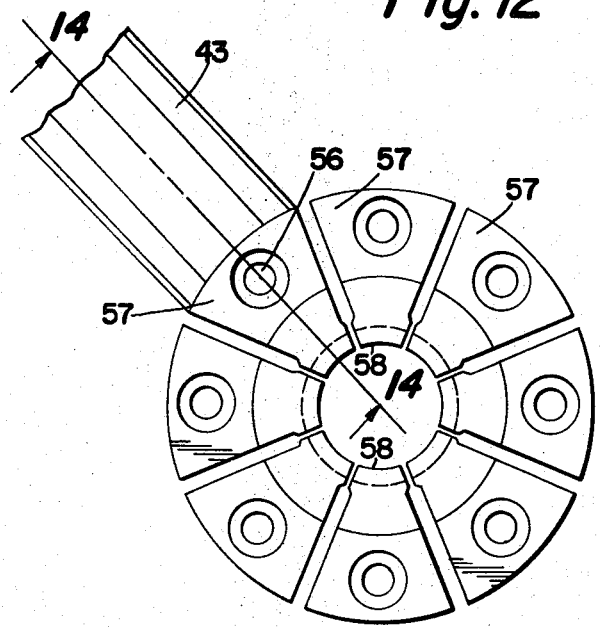
FIG. 13 is a fragmentary elevational view showing one of the crimping jaw holders and the manner in which a crimping jaw is mounted thereon, as well as the entire assemblage of crimping jaws in the relative position they occupy at the completion of the crimping operation.
Figure 14:
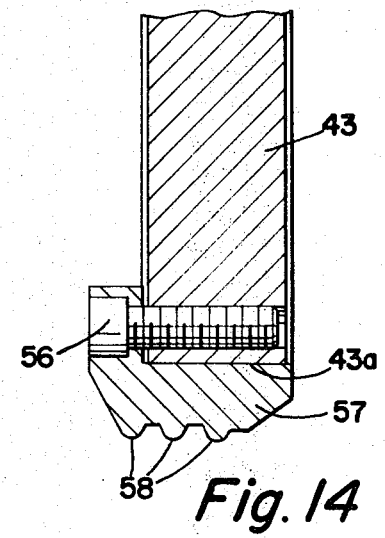
FIG. 14 is a fragmentary cross-sectional view, taken on the line 14-14 of FIG. 13.

The jaw holders 43 have arcuate inner ends 43a, and have secured to these ends, as by means of socket head screws 56, crimping jaws 57, the conformation of which is best seen in FIGS. 13 and 14, these jaws, in this instance, being provided with three arcuate crimping elements 58, spaced axially of the jaws.

Secured to the flat surfaces 38 and 42 of the disks 37 and 39 respectively, as by means of screws 59, is a clevis or yoke 60, to which is pivotally secured, as by a pin 61, the lower end of the ram 62 of a press of the hydraulic or other type. The ram 62, in this instance, has a 2″ stroke, that is to say, it has a stroke which extends from a point 1″ above the center line CL indicated in FIG. 8, to a point 1″ below this center line, the lower end of the stroke corresponding with the completion of the crimping operation.

The operation of the crimping machine, for the purpose of providing the crimps 8 (see FIG. 3) may be described as follows:

With the ram 62 of the press in its uppermost position, that is to say, at the top of its stroke, the hose assembly, as shown in FIGS. 1 and 2, is inserted into the machine, at a position such that the shell 2 is disposed in a position to be engaged by the crimping elements 58 when the press is actuated, as by a button, foot treadle, or like actuating member.

Figure 8:
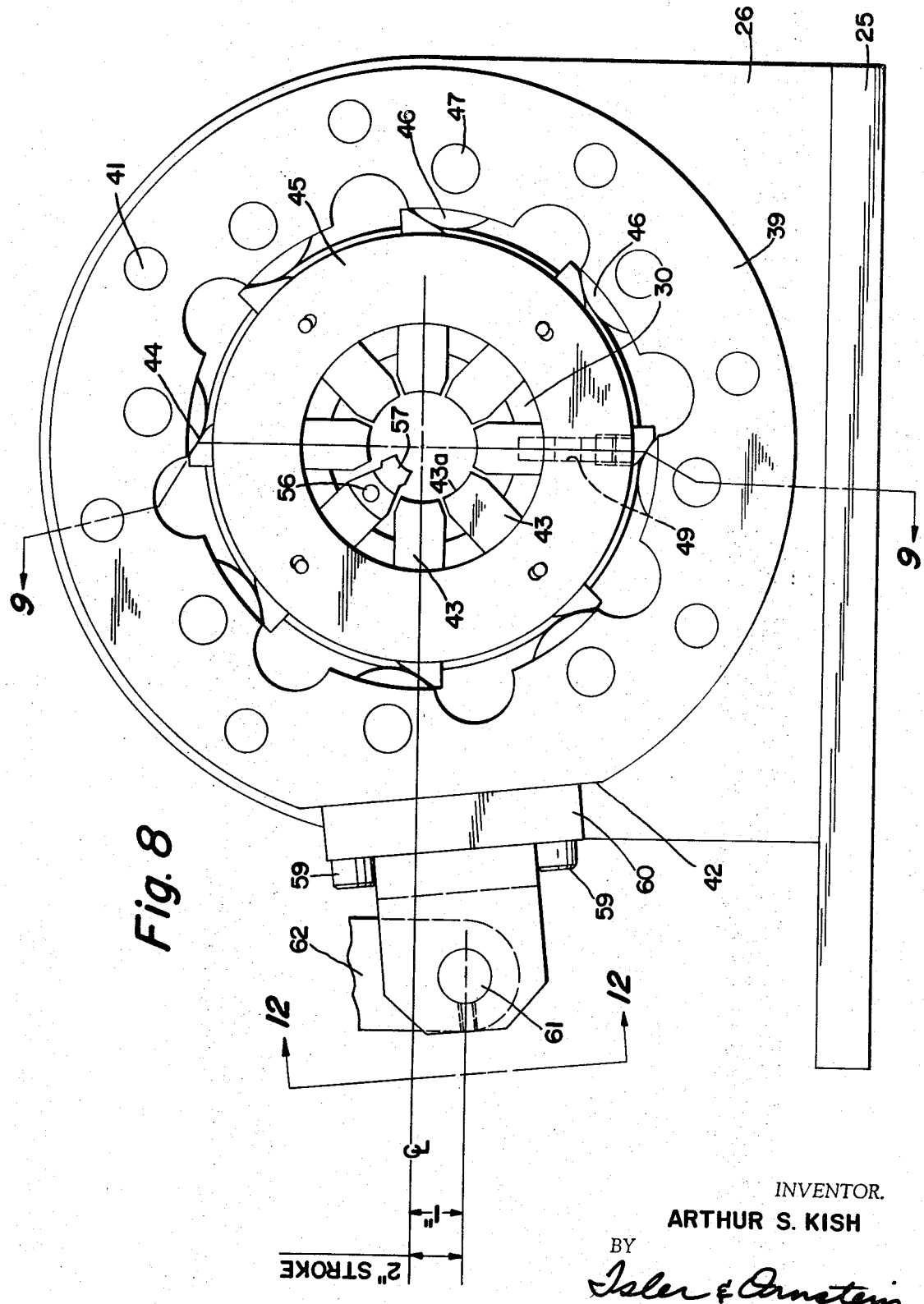
FIG. 8 is a fragmentary front elevational view of the crimping machine, but showing only one of the crimping jaws, and with the parts of the machine in the position they occupy at the completion of the crimping operation.
Figure 9:
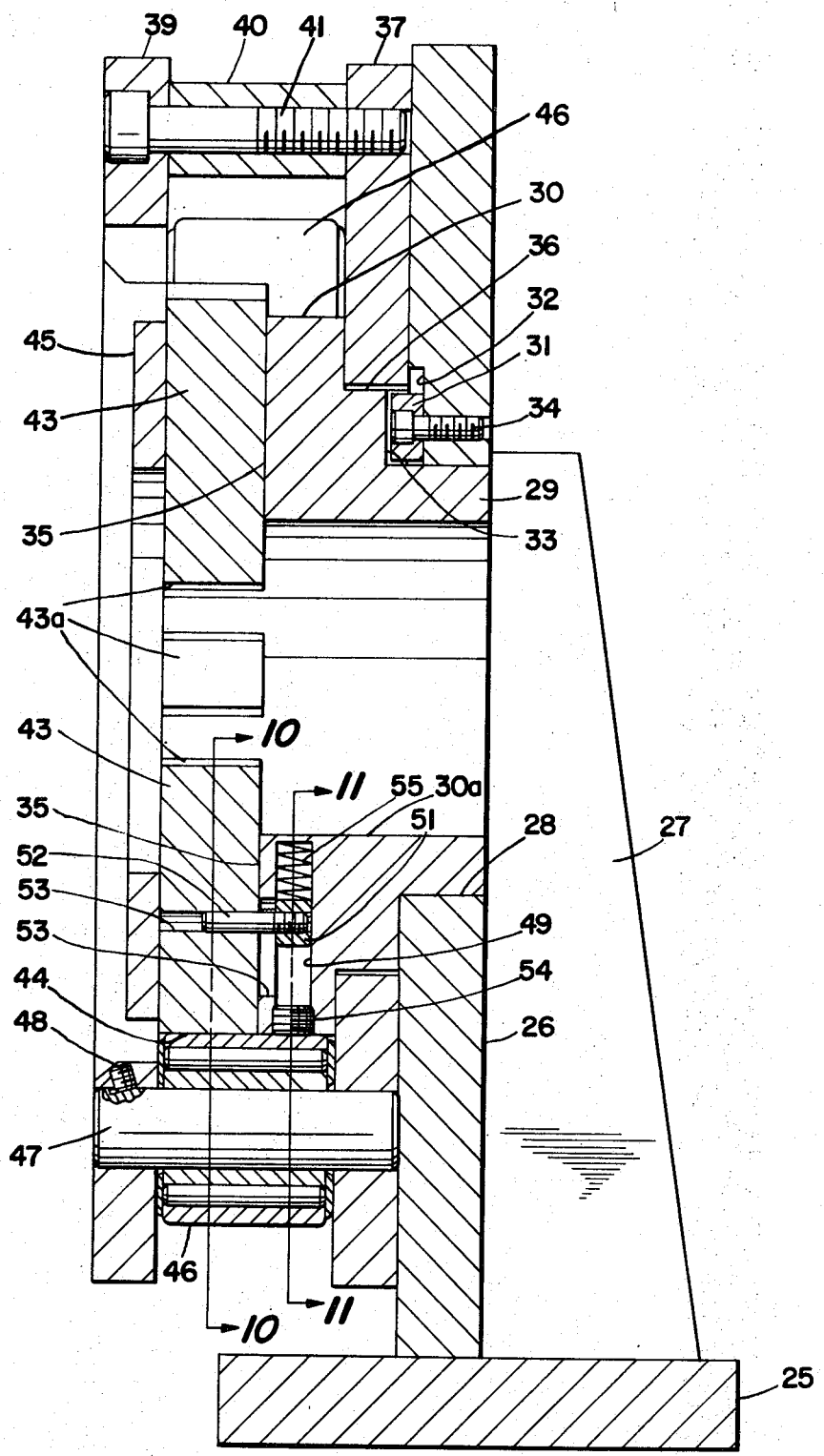
FIG. 9 is a cross-sectional view, taken on the line 9-9 of FIG. 8.
Figures 10, 11:
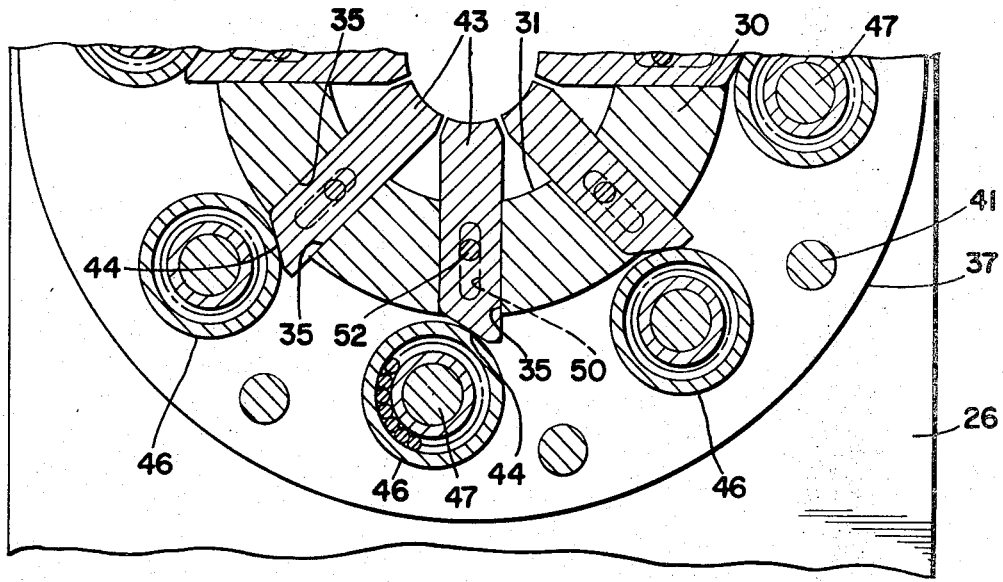
FIG. 10 is a fragmentary cross-sectional view, taken on the line 10-10 of FIG. 9.
FIG. 11 is a fragmentary cross-sectional view, taken on the line 11-11 of FIG. 9.
Figure 12:
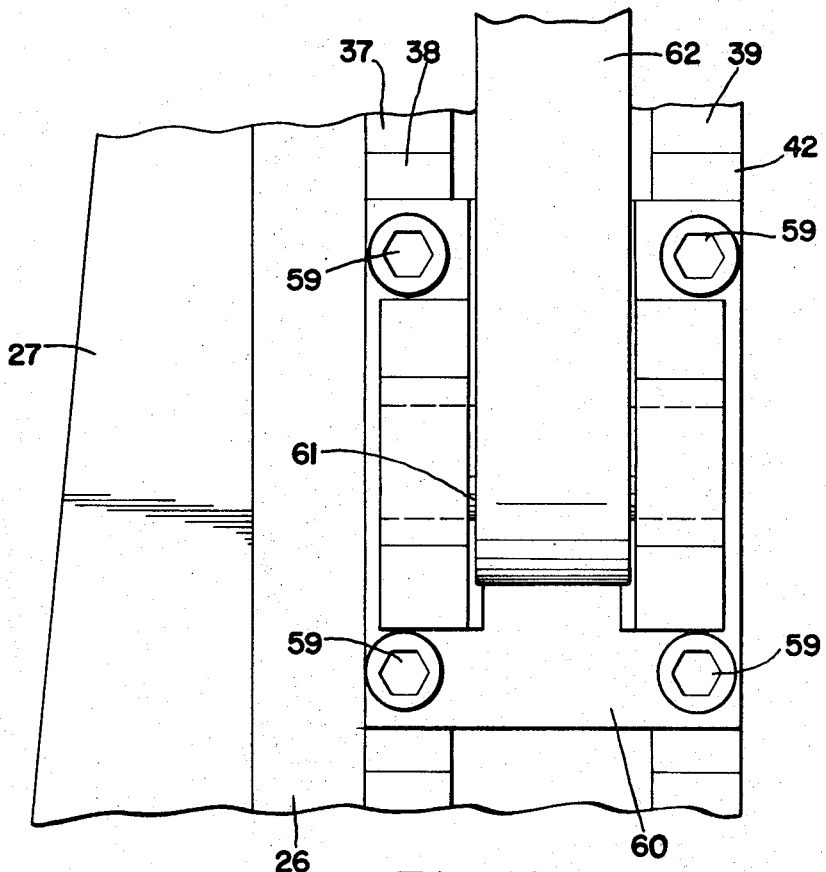
FIG. 12 is a fragmentary elevational view, taken in the direction indicated by the arrows 12-12 of FIG. 9.

This actuation of the press causes the ram to descend to the bottom of its stroke, as shown in FIG. 8, thereby causing the disks 37 and 39 to move in unison through an arc in a counterclockwise direction, as viewed in FIG. 9, which, in turn, causes the cam rollers 46 to engage the cam surfaces 44 of the jaw holders 43, to thereby cause the jaw holders 43 to move inwardly to the position shown in FIGS. 9 and 13, in which position, the crimps 8 are formed by the crimping jaws 57 and their crimping elements 58.

At the conclusion of the crimping operation, the ram 62 is lifted to the top of its stroke, permitting the springs 55 to expand and thereby returning the jaw holders to their original position.

I claim:

1. In a hose assembly of the character described, a nipple, a shell of uniform wall thickness throughout the length thereof, and a hose clamped between said nipple and shell, said shell being swaged at one end to provide a substantially conical flange constituting a stop for the end of the hose and a reduced cylindrical portion of substantially the same internal diameter as the external diameter of the nipple extending rearwardly from said flange in a direction away from the end of the hose, said last-named portion being brazed to said nipple.

2. A hose assembly, as defined in claim 1, wherein said shell has a body portion of uniform wall thickness, which is crimped to said hose.

3. A hose assembly, as defined in claim 2, wherein said nipple is provided with axially-spaced circumferential ridges embedded in said hose.

4. A hose assembly, as defined in claim 3, wherein said nipple extends beyond said reduced portion of the shell, and an adapter independent of the nipple is provided into which said extension projects and to which it is brazed.

5. A hose assembly, as defined in claim 4, wherein said nipple has an external diameter which corresponds substantially to the normal unstressed interior diameter of said hose.

6. A hose assembly, as defined in claim 5, including a nut slidably mounted on said adapter.

7. A hose assembly, as defined in claim 1, wherein a block is provided having an opening in the wall thereof and a passageway perpendicular to said opening, and said nipple extends beyond said reduced portion of the shell and into said opening, said extension being brazed to the wall of said opening.

8. A hose assembly, as defined in claim 7, wherein an adapter is provided, which is secured to said block.

9. A hose assembly, as defined in claim 8, including a nut slidably mounted on said adapter.